United States Patent [19]

Holt et al.

[11] Patent Number: 4,682,000

[45] Date of Patent: Jul. 21, 1987

[54] WELDING TRANSFORMER AND RECTIFIER ASSEMBLY

[75] Inventors: Gary E. Holt, Holland; Mark B. Siehling; Stanley R. Van Antwerp, both of Hudsonville, all of Mich.

[73] Assignee: Conrac Corporation, Hudsonville, Mich.

[21] Appl. No.: 712,796

[22] Filed: Mar. 18, 1985

[51] Int. Cl.[4] .............................................. B23K 11/24

[52] U.S. Cl. .................................... 219/116; 219/108; 336/192

[58] Field of Search ...................... 219/116, 108, 130.1, 219/137 PS; 336/192, 232

[56] References Cited

U.S. PATENT DOCUMENTS

| | | | |
|---|---|---|---|
| Re. 31,444 | 11/1983 | Block | 219/116 |
| 2,181,644 | 11/1939 | Seifert . | |
| 2,535,554 | 12/1950 | Thurston . | |
| 3,495,067 | 2/1970 | Sciaky | 219/116 |
| 3,663,790 | 5/1972 | Humblot | 219/116 |
| 3,725,632 | 4/1973 | Ritter et al. | 219/116 |
| 3,742,334 | 6/1973 | Leathers | 219/116 |
| 3,763,344 | 10/1973 | Okabe et al. | 219/116 |
| 3,832,661 | 8/1974 | Sato | 336/212 |
| 3,840,720 | 10/1974 | Wolf | 219/116 |
| 4,233,488 | 11/1980 | Schwartz | 219/116 |
| 4,485,289 | 11/1984 | Schwartz | 219/116 |
| 4,488,135 | 12/1984 | Schwartz | 336/62 |
| 4,496,821 | 1/1985 | Burgher et al. | 219/116 |
| 4,571,669 | 2/1986 | Tsujii et al. | 219/137 PS |

*Primary Examiner*—Clifford C. Shaw

*Attorney, Agent, or Firm*—Price, Heneveld, Cooper, DeWitt & Litton

[57] ABSTRACT

The specification discloses a lightweight, compact welding transformer particularly well suited for robotic applications. The transformer includes coplanar secondary pads, a parallel common bus, and a secondary coil having turns each including a first end coupled to the common bus and a second end extending through the common bus and coupled to one of the secondary pads. The transformer further includes planar diodes abutting the secondary pads opposite the coil and a planar rectified bus abutting the diodes to sandwich them against the secondary pads.

20 Claims, 7 Drawing Figures

WELDING TRANSFORMER AND RECTIFIER ASSEMBLY

BACKGROUND OF THE INVENTION

The present invention relates to welding transformers and rectifiers, and more particularly to transformers and rectifiers for robotic welders.

In resistance welding, coalescence is produced primarily by resistive heat created by passing an electric current through the workpiece. A resistance welder includes primary conductors, a transformer, secondary conductors, and welding electrodes. The primary conductors couple the transformer to a power source. The secondary conductors interconnect the transformer and the electrodes.

Typically, the primary power source or supply in resistance welding provides power at the line frequency—for example, 60 hertz (Hz) in the United States and 50 Hz in Europe. Welding transformers for this relatively low-frequency current are excessively heavy for many robotic welders where weight is a primary consideration.

In an attempt to reduce the weight of the transformer, artisans have used relatively high-frequency power sources (e.g., 400 or 1200 Hz). By so boosting the frequency, the transformer weight can be greatly reduced. However, the increased frequency requires the secondary voltage to be increased because of increased inductive reactance, which is directly proportional to frequency. In an attempt to reduce impedance, artisans have rectified the secondary voltage/current. One such construction is illustrated in U.S. Pat. No. Re. 31,444, reissued Nov. 15, 1983, to Block, and entitled TWO-PHASE TRANSFORMER AND WELDING CIRCUIT THEREFOR. Such constructions are relatively bulky and heavy and therefore not fully adaptable to all robotic welders. Further, the shunts between the transformer and the rectifier are "inductive throats", such that the high-frequency reactance problem remains.

SUMMARY OF THE INVENTION

The aforementioned problems are overcome in the present invention wherein an extremely lightweight and compact welding transformer and rectifier assembly provides a rectified secondary current. The size and weight of the unit are greatly reduced over known units; and the unit is believed to comply with all known weight and size restrictions for robotic welders.

In a first aspect of the invention, the rectifier assembly directly abuts the secondary pads of the transformer to eliminate inductive throats therebetween. More particularly, in this aspect, the transformer includes a pair of secondary pads, at least one diode overlying and abutting each secondary pad, and a rectified bus overlying and abutting the diodes. Consequently, a rectified current is outputted on the rectified bus. The sandwiching of the diodes directly against the secondaries greatly reduces both the profile of the transformer and its weight. Inductance due to electrical connections between the transformer and the rectifier assembly are virtually eliminated. The unit therefore provides improved performance in a smaller and lighter weight package than known units.

In a second aspect of the invention, the common bus of the transformer is configured to further reduce the size and weight of the unit. More particularly, in this aspect, the transformer includes a pair of coplanar secondary pads, a planar common bus overlying the secondary pads, and a plurality of secondary coil turns. Each turn includes a first end connected to the common bus and a second end extending through or beyond the common bus and connected to one of the secondary pads. Preferably, the bus defines some apertures permitting the second turn ends to extend therethrough without electrically contacting the bus. This intermeshing of the coil turns and common bus further reduces the transformer unit size and weight.

These and other objects, advantages, and features of the invention will be more fully understood and appreciated by reference to the detailed description of the preferred embodiment and the drawings.

DETAILED DESCRIPTION OF THE PREFERRED EMBODIMENT

Figure 2:
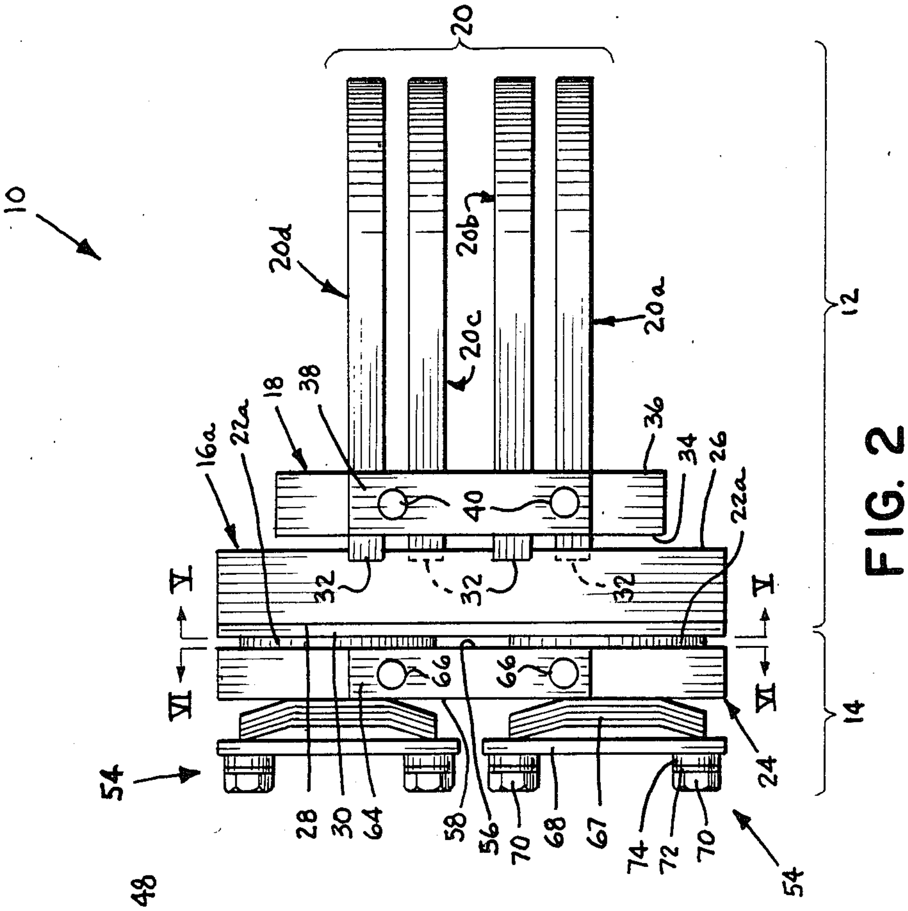
FIG. 2 is a top elevational view of the assembly.
Figure 1:
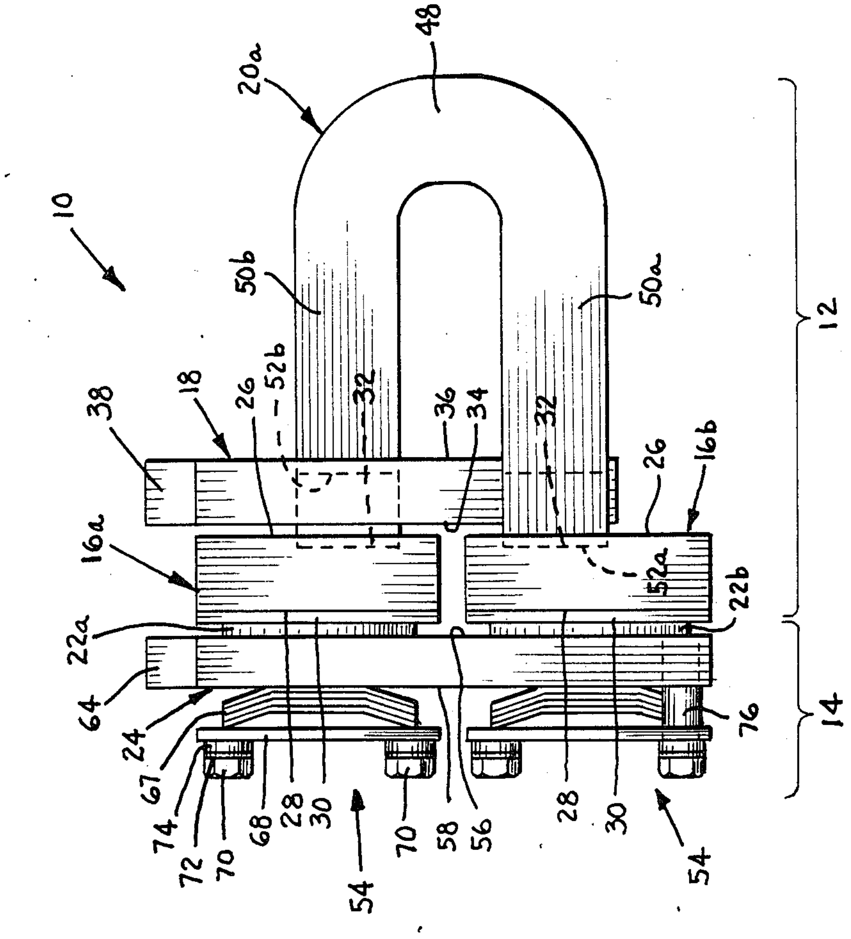
FIG. 1 is a side plan view of the welding transformer and rectifier assembly of the present invention.

A welding transformer and rectifier unit or assembly constructed in accordance with a preferred embodiment of the invention is illustrated in the drawings and generally designated 10. The transformer includes a transformer portion 12 and a rectifier portion 14 (FIGS. 1 and 2). The transformer portion 12 includes a pair of generally coplanar secondary connectors or pads **16*a* and 16*b*, a common bus 18, and a secondary coil 20. Each turn of the coil 20 includes a first end electrically connected to the common bus 18 and a second end electrically connected to one of pads 16*a* and 16*b*. The common bus 18 is configured to permit the second end of each turn to extend therethrough without electrically contacting the bus. The rectifier portion 14 includes a plurality of disk diodes 22*a* and 22*b* sandwiched against the secondary pads 16*a* and 16*b*, respectively, and a rectified bus 24 sandwiched against the diodes 22. Alternating current on the secondary pads 16 is rectified to single-phase DC current on the rectified bus 24**.

Each of the secondary pads 16 (FIGS. 1-3 and 5) is a generally rectangular parallelepiped. Each secondary pad 16 includes a coil face 26 and an opposite rectifier face 28. The coil faces 26 of the two pads are coplanar, and the rectifier faces 28 are also coplanar and parallel to the coil faces. Optionally, wear pads 30 can be mounted on rectifier faces 28. If included, each wear pad 30 preferably extends the full height and width of the secondary pad 16 on which it is mounted. The secondary pads 16 define slots 32 in their coil faces 26 to receive the coils 20. The pads also define tapped bores 33 to receive bolts 70 as will be described.

Figure 7:
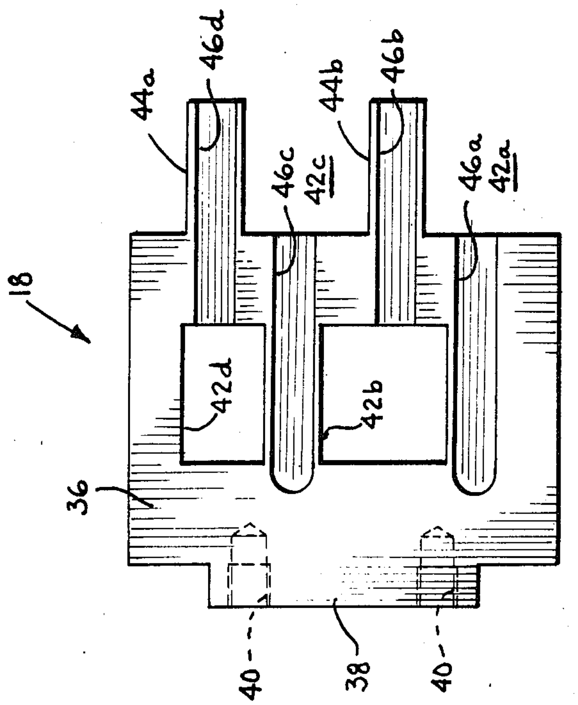
FIG. 7 is an elevational view of the common bus.

The common bus 18 (FIGS. 1-3 and 7) is generally planar and generally parallel to the secondary pads 16. The common bus 18 includes a pad face 34 and a coil face 36, which are parallel to one another. The common bus 18 includes a terminal portion 38 defining tapped bores 40 which receive electrical connectors in conventional fashion. The common bus 18 also defines a pair of rectangular apertures or voids 42*b* and 42*d* (FIG. 7) which extend through the common bus to receive certain coil ends as will be described. Opposite terminal edge 38 are a pair of arms 44*a* and 44*b* which define a void or open-sided aperture 42*c* therebetween. A fourth void or open-sided aperture 42*d* is located directly below arm 44*a*. A plurality of slots or recesses 46*a*, 46*b*, 46*c*, and 46*d* are formed in the coil face 36 of the common bus 18 to receive coil ends.

The turns or loops of secondary coil 20 (FIGS. 1–3) are generally identical to one another. The turns are grouped into two sets of physically alternating turns or every other turn—a first set including turns 20*a* and 20*c* and a second set including turns 20*b* and 20*d*. Each of the turns 20 is extruded copper and preferably hollow to permit water cooling.

The turn 20*a* (FIGS. 1 and 2) includes a bight portion 48 and a pair of legs 50*a* and 50*b* extending therefrom. The legs 50 are generally physically parallel to one another, and leg 50*a* is longer than 50*b*. Leg 50*a* includes a pad end 52*a* which extends through void 42*a* in the common bus and is electrically connected to the secondary pad 16*b*. Leg 50*a* therefore does not contact the common bus 18 but only the secondary pad 16*b*. The turn end 52*a* is silver soldered in the slot 32 in the secondary pad 16*b*. The shorter leg 50*b* includes a bus end 52*b* positioned within slot 46*a* of the common bus 18. Consequently, leg 50*b* does not extend through the common bus, but rather is electrically connected thereto.

Turn 20*c* is identical to turn 20*a* and includes a longer leg 50*a*, which extends through void 42*c* in the common bus 18 and is connected to pad 16*b*, and a shorter leg 50*b* which is electrically connected to the common bus in slot 46*c*. Consequently, the first set of turns 20*a* and 20*c* is electrically connected to the common bus 18 and to the secondary pad 16*b*. The common bus 18 is configured to receive the long legs 50*a* of turns 20*a* and 20*c* therethrough.

Turns 20*b* and 20*d* (FIGS. 2–3) are generally identical to turns 20*a* and 20*c* but are rotated 180 degrees or "flipped over". Consequently, longer legs 50*a* of turns 20*b* and 20*d* extend through voids 42*b* and 42*d*, respectively, in the common bus 18 to be electrically connected to the secondary pad 16*a*. The shorter legs 50*b* of turns 20*b* and 20*d* are electrically connected to the common bus 18 within slots 46*b* and 46*d*, respectively. Consequently, the turns 20*b* and 20*d* of the second set are electrically connected to the common bus 18 and to the secondary pad 16*a*.

The rectifier portion 14 (FIGS. 1–2) includes generally planar disk diodes 22, rectified bus 24, and spring assemblies 54. The spring assemblies 54 are anchored to the secondary pads 16 to urge the rectified bus 24 agains the disk diodes 22 and therefore sandwich the disk diodes between the rectified bus and the secondary pads 16.

Disk diodes 22 are generally well-known to those in the diode art. These diodes are preferably 52 millimeter diodes sold as Model No. R9KN0610 by Westinghouse. Typically, such disk diodes include an overflow silicon bead about the periphery edge of one face formed during manufacture. Other diodes could be substituted therefor.

Figure 6:
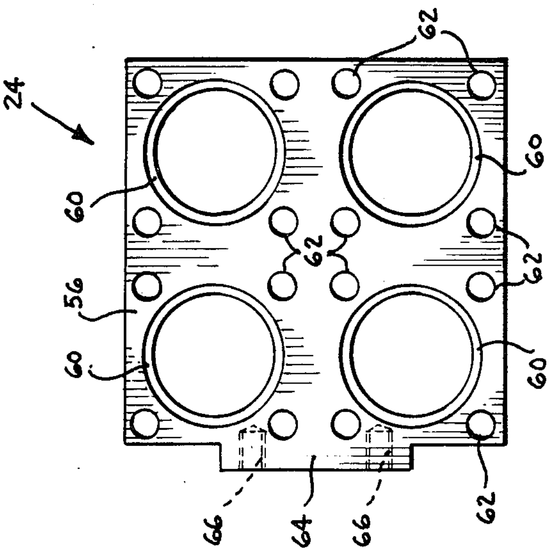
FIG. 6 is a view taken along plane VI—VI in FIG. 2.
Figure 5:
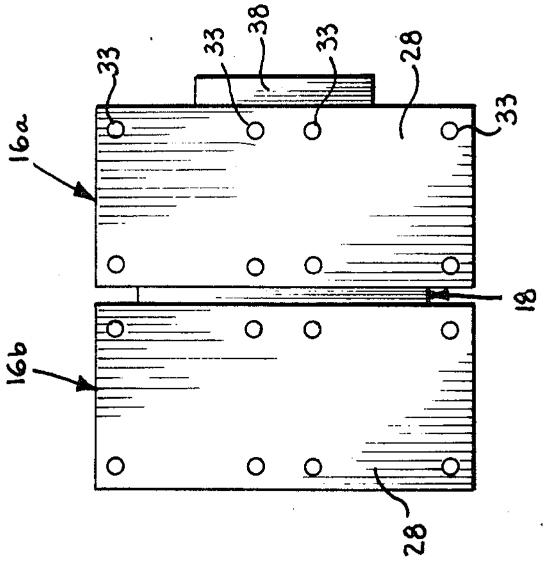
FIG. 5 is a view taken along plane V—V in FIG. 2.

Rectified bus 24 (FIGS. 1–2 and 6) is generally planar and generally parallel to the disk diodes 22 and the secondaries 16. The rectified bus 24 includes a diode face 56 and a spring face 58 generally parallel to one another. The diode face defines four circular grooves 60 to each receive the silicon bead of a disk diode 22 permitting the bus 24 to fully abut the faces of the diodes. Each groove 60 is flanked by four throughbores 62 spaced evenly thereabout. The rectified bus 24 includes a terminal portion 64 defining a pair of threaded bores 66 to receive conventional electrical connectors.

The secondary pads 16, common bus 18, and rectified bus 24 are all fabricated of copper stock having a low-stress sulfamate nickel plate. Other suitable electrically conductive materials could also be substituted. Additionally, secondary pads 16, common bus 18, coils 20, and rectified bus 24 are water cooled in conventional fashion (not shown).

Figure 4:
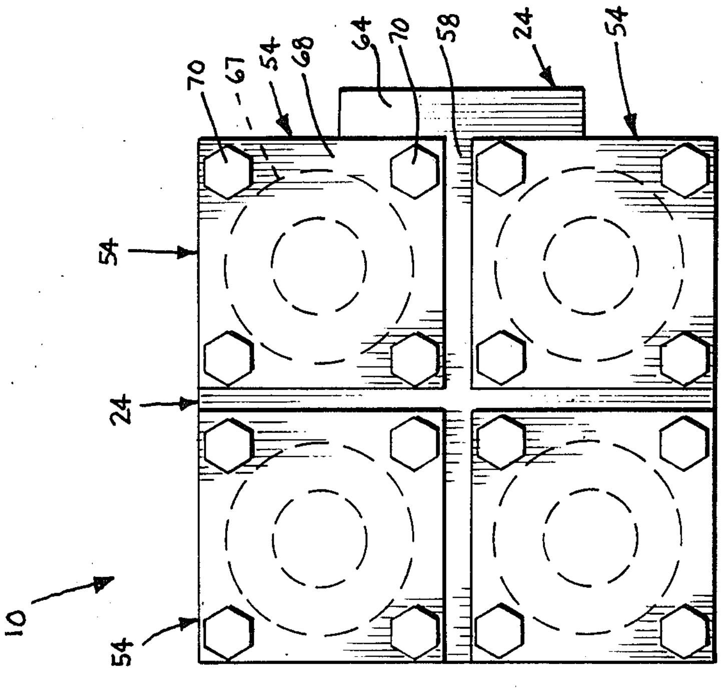
FIG. 4 is an end elevational view taken from the left side of FIG. 2.
Figure 3:
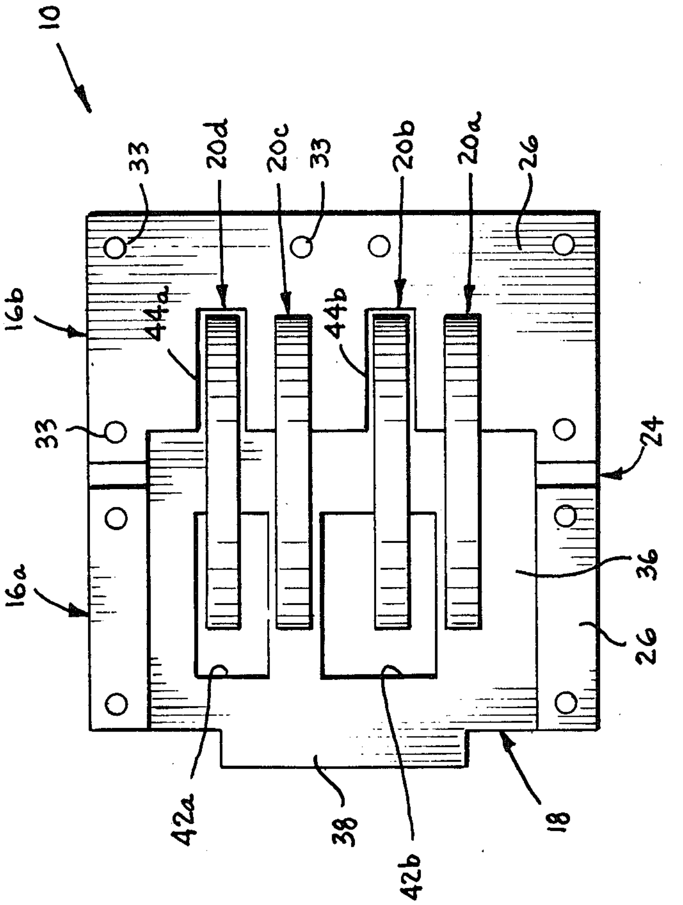
FIG. 3 is an end elevational view taken from the right side of FIG. 2.

The four spring assemblies (FIGS. 1–2 and 4) are generally identical to one another and are included to accommodate thermal expansion in the unit. One spring assembly 54 is positioned over each of diodes 22 so that the spring force against each diode independently adjustable. Each assembly 54 includes a stack of spring washers 67, a back-up plate 68, and bolts 70. In the preferred embodiment, the spring washers 67 are known in the industry as Belville springs. Back-up plate 68 sandwiches the spring washers 67 against the rectified bus 24. Although not fully shown, bolts 70 extend through back-up plate 68 and the bores 62 in the rectified bus 24 and are threadedly received in the apertures 33 in the secondary pads 16. A stainless steel washer 72 and on insulated washer 74 are positioned over each of bolts 70 between the head and the back-up plate 68. Additionally, an insulated sleeve 76 (only one shown in FIG. 1) is positioned over each bolt 70 and extends through the back-up plate 68 and the rectified bus 24. Therefore, bolts 70 are electrically connected to the secondary pad 16 in which they are anchored and electrically insulated from the rectified bus 24 and the back-up plates 68. The sleeves 76 support and position the diodes 22.

Operation

After the transformer is assembled as described above, a primary coil (not shown) and a core (not shown) are installed in conjunction with the secondary coil 20 in conventional fashion. The secondary connectors or pads 16, the common bus 18, the coil 20, the priamry coil, and the core are potted for electrical, thermal, and structural integrity. Bolts 70 are carefully torqued to provide a desired spring force against the rectified bus 24 through spring washers 66. In the preferred embodiment, the desired spring force is 5500 pounds. Electrical connectors (not shown) are secured to the common bus 18 at bores 40 in the terminal portion 38. Similarly, electrical connectors (not shown) are secured to the rectified bus 24 in the bores 66 in terminal portion 64. The transformer is then ready for use particularly in conjunction with a robotic welder.

A primary voltage is applied to the primary coils (not shown) at approximately 1200 Hz. The relatively high frequency enables the transformer to be much smaller and lighter than those transformers utilizing line frequencies. A secondary voltage is induced in the secondary coil 20 which appears as an alternating voltage across the secondary pads 16*a* and 16*b*. This alternating current is rectified through diodes 22 so that single-phase full-wave DC current is applied to the rectified bus 24. Consequently, the transformer and rectifier unit supplies a DC voltage to eliminate reactance problems.

Further, the described configuration is extremely compact and lightweight enabling the transformer to be used in a wide variety of robotic and fixture type applications where both size and weight are significant constraints.

The bove description is that of a preferred embodiment of the invention. Various changes and alterations can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A transformer assembly comprising:

a plurality of generally coplanar secondary connector pads;

a generally planar common bus generally parallel to and overlying said secondary pads;

secondary coil means including at least four turns each having a pad end and a bus end, said turns being generally orthogonal to said secondary pads and said common bus;

means for electrically connecting each of said bus ends to said common bus;

means for electrically connecting each of said pad ends to one of said secondary pads through said common bus, said pad ends and said pad ends connecting means being electrically insulated from said common bus.

2. A transformer as defined in claim 1 wherein said common bus defines void means through which extend selected ones of said pad ends and said pad ends connecting means.

3. A transformer as defined in claim 2 wherein said common bus is one piece.

4. A transformer as defined in claim 1 wherein every other turn is connected to one of said secondary pads and the other turns are connected to another of said secondary pads.

5. A transformer as defined in claim 1 further comprising:

at least one generally planar rectifier means overlying and abutting each of said secondary pads;

a rectified bus overlying and abutting said rectifier means to sandwich said diodes between said secondary pads and said rectified bus; and spring means for biasing said rectified bus against said rectifier means.

6. A transformer as defined in claim 5 wherein said spring means includes one spring concentrically oriented with respect to each rectifier means.

7. A transformer as defined in claim 5 further comprising a plurality of wear pads, each removably mounted on one of said secondary connector pads facing said rectifier means, whereby failure of said rectifier means will affect only said removable wear pads and not said secondary connector pads.

8. A transformer/rectifier assembly comprising:

secondary coil means;

a pair of secondary connector pads electrically coupled to said coil means, each pad defining a rectifier face generally opposite said coil means;

a rectifier means overlying and abutting each secondary pad;

a rectified bus overlying and abutting said rectifier means; and spring means for biasing said rectified bus toward said rectifier means, said spring means including means for independently adjusting the biasing force toward each rectifier means, said spring means further including a spring concentrically oriented with respect to each said rectifier means.

9. A transformer as defined in claim 8 wherein said rectifier faces of said connector pads are generally coplanar and further wherein said rectifier means are generally planar.

10. A transformer/rectifier assembly as defined in claim 8 further comprising a pair of wear pads each removably mounted between one of said secondary connector pads and the associated rectifier means to facilitate servicing of said assembly upon failure of one of said rectifier means.

11. A transformer/rectifier assembly comprising:

a plurality of generally coplanar secondary pads;

secondary coil means secured to said pads;

a plurality of generally coplanar rectifier means overlying said secondary pads, each of said rectifier means being electrically connected to only one of said secondary pads;

a rectified bus means overlying asid rectifier means; and a plurality of wear pads, each being removably mounted between one of said secondary pads and the associated rectifier means, whereby failure of one of said rectifier means may damage the associated wear pad rather than said secondary pad.

12. A transformer/rectifier assembly as defined in claim 11 further comprising spring means for urging said rectified bus toward said secondary pads, said spring means including one spring concentrically oriented with respect to each rectifier means to apply a force directly over each rectifier means.

13. A transformer comprising:

secondary coil means including at least four turns each including first and second ends;

a pair of generally coplanar secondary connector pads oriented generally perpendicularly to the plane of said turns, the first end of each of said turns being electrically connected to one of said secondary connector pads; and a generally planar common bus generally parallel to and generally overlying said secondary connector pads the second end of each of said turns being electrically connected to said bus, said bus defining void means permitting the first turn ends to extend through said bus vithout contacting said bus.

14. A transformer as defined in claim 13 wherein said common bus is fabricated of a single piece of material.

15. A transformer as defined in claim 14 wherein said turns comprise two sets of physically alternating turns, the turns in each set being connected to a common secondary pad.

16. A transformer as defined in claim 13 wherein said turns comprise two sets of physically alternating turns, the turns in each set being connected to a common secondary pad.

17. A transformer comprising:

secondary connector means;

common bus means proximate said connector means; and secondary coil means including at least four turns, each turn including first and second ends, said first turn ends being electrically connected to said common bus means, said second turns ends being electrically connected to said secondary connector means through said common bus means without contacting said common bus means.

18. A transformer is defined in claim 17 wherein said common bus defines void means for receiving said second ends therethrough.

19. A transformer as defined in claim 18 wherein said common bus is a single piece.

20. A transformer as defined in claim 17 wherein said secondary connector means includes a pair of secondary pads, and further wherein said turns are arranged in two sets of physically alternating turns, the turns within either set being connected to a common secondary pad.

* * * * *